US012769436B2

(12) United States Patent
Lamere et al.

(10) Patent No.: US 12,769,436 B2
(45) Date of Patent: Oct. 20, 2026

(54) SYSTEMS AND METHODS FOR GENERATING MEDIA CONTENT RECOMMENDATIONS FOR SHARED PLAYBACK

(71) Applicant: Spotify AB, Stockholm (SE)

(72) Inventors: Jennifer Lamere, Cumberland, ME (US); Gerson Luis Ferreira Da Silva Filho, Pompano Beach, FL (US); Jeremy Hopple, Jackson, WY (US); Maia Ezratty, New York, NY (US); Julia Eskew, Boston, MA (US); David Suarez, Brooklyn, NY (US); Mike Moscardini, Boston, MA (US); Evelyn Lucas, New York, NY (US); Michael Mazzola, Austin, TX (US)

(73) Assignee: Spotify AB, Stockholm (SE)

( * ) Notice: Subject to any disclaimer, the term of this patent is extended or adjusted under 35 U.S.C. 154(b) by 297 days.

(21) Appl. No.: 18/441,452

(22) Filed: Feb. 14, 2024

(65) Prior Publication Data

US 2025/0258586 A1 Aug. 14, 2025

(51) Int. Cl.

*G06F 3/0484* (2022.01)
*G06F 3/0482* (2013.01)
*G06F 16/435* (2019.01)
*G06F 16/438* (2019.01)

(52) U.S. Cl.

CPC .......... *G06F 3/0484* (2013.01); *G06F 3/0482* (2013.01); *G06F 16/435* (2019.01); *G06F 16/438* (2019.01)

(58) Field of Classification Search

CPC .... G06F 3/0484; G06F 3/0482; G06F 16/435; G06F 16/438

See application file for complete search history.

(56) References Cited

U.S. PATENT DOCUMENTS

| | | | | |
|---|---|---|---|---|
| 8,909,729 | B2 * | 12/2014 | Rothschild | G06Q 10/10 709/217 |
| 9,367,808 | B1 | 6/2016 | Farrelly | |
| 10,523,722 | B1 | 12/2019 | Katz et al. | |
| 2007/0168463 | A1 * | 7/2007 | Rothschild | G06Q 10/10 709/217 |
| 2017/0289629 | A1 * | 10/2017 | Zhou | H04N 21/4826 |
| 2018/0336645 | A1 * | 11/2018 | Price | G06Q 10/40 |
| 2019/0369948 | A1 * | 12/2019 | Gibson | H04N 21/25891 |

(Continued)

*Primary Examiner* — Anil K Bhargava

(74) *Attorney, Agent, or Firm* — Morgan, Lewis & Bockius LLP

(57) ABSTRACT

A computer system receives, while a first user is participating in a shared playback session that includes the first user and a plurality of users other than the first user, a request for a set of recommended media items. In response to receiving the request, the computer system: retrieves a first set of media items from a playback history of the first user; retrieves a plurality of probabilistic data structures for the plurality of users other than the first user, each probabilistic data structure indicating a playback history of a respective user of the plurality of users other than the first user; and provides, for display in a user interface, the set of recommended media items that comprises a subset of the first set of media items selected based on the playback histories of the plurality of users as indicated by the plurality of probabilistic data structures.

20 Claims, 9 Drawing Sheets

(56) References Cited

U.S. PATENT DOCUMENTS

| | | | | |
|---|---|---|---|---|
| 2021/0311982 | A1* | 10/2021 | Kizelshteyn | G06F 16/435 |
| 2022/0365960 | A1 | 11/2022 | Kizelshteyn et al. | |
| 2023/0300415 | A1* | 9/2023 | Balsamo | G06F 3/04847<br>725/139 |

* cited by examiner

SYSTEMS AND METHODS FOR GENERATING MEDIA CONTENT RECOMMENDATIONS FOR SHARED PLAYBACK

TECHNICAL FIELD

The disclosed embodiments relate generally to media provider systems, and, in particular, to generating recommendations for a shared playback session that includes multiple users using the playback histories of the users.

BACKGROUND

Access to electronic media, such as music, videos, podcast, and audiobook content, has expanded dramatically over time. As a departure from physical media, media content providers stream media to electronic devices across wireless networks, improving the convenience with which users can digest and experience such content.

SUMMARY

As it becomes easier for users to find and share content, media content providers can enable users to create shared playback sessions to provide multiple users with additional control options during playback sessions. Media content providers provide recommendations for additional content items that are likely to be well-received by a plurality of the users participating in the shared playback sessions.

It is therefore a general object of embodiments disclosed herein to provide real-time collaborative playlists and/or playback sessions for a plurality of users. Individual users within the collaboration can add media items to the playlist (referred to herein as a queue). When a respective user goes to add media items to the collaborative playlist, the system described herein recommends media items (e.g., tracks) to be added and provides the recommended media items to the respective user. In generating the recommended media items, the system aims to identify media items that have been consumed by the respective user and at least one other user participating in the collaborative playback session in order to create a positive group experience and provide additional control options to users in the playback session.

To that end, disclosed is a method for providing recommendations to a user for the user to add to a shared playback session. The recommendations are determined based on the playback histories of the user as well as other users in the playback session. In order to be up-to-date, both in terms of the tracks that are already in the playlist as well as the user's that are currently participating in the listening session, these recommendations need to be generated with low latency. The problem is that, for listening sessions with a large number of participating users, the data required for all of the users' listening histories is difficult to process in near-real-time. To solve this problem, the listening histories for the other users are represented using Bloom filters, Cuckoo filters, or another probabilistic data structure. While using probabilistic data structures representing the playback histories of the other users are not guaranteed to be fully accurate, they are used for scalability and speed to generate the recommendations.

The recommendations that are presented to a respective user are selected from that user's own playback history and are optionally further based on the media items that are already added to the shared playback session.

To that end, in accordance with some embodiments, a method is provided. The method includes, while a first user is participating in a shared playback session that includes the first user and a plurality of users other than the first user, receiving a request, from the first user, for a set of recommended media items. The method further includes, in response to receiving the request, retrieving a first set of media items from a playback history of the first user and retrieving a plurality of probabilistic data structures for the plurality of users other than the first user, each probabilistic data structure indicating a playback history of a respective user of the plurality of users other than the first user. The method includes providing, for display in a user interface, the set of recommended media items, wherein the set of recommended media items comprises a subset of the first set of media items selected based on the playback histories of the plurality of users other than the first user as indicated by the plurality of probabilistic data structures.

In accordance with some embodiments, an electronic device is provided. The electronic device includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein.

Thus, systems are provided with improved methods of generating recommended media items for a shared playback session.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
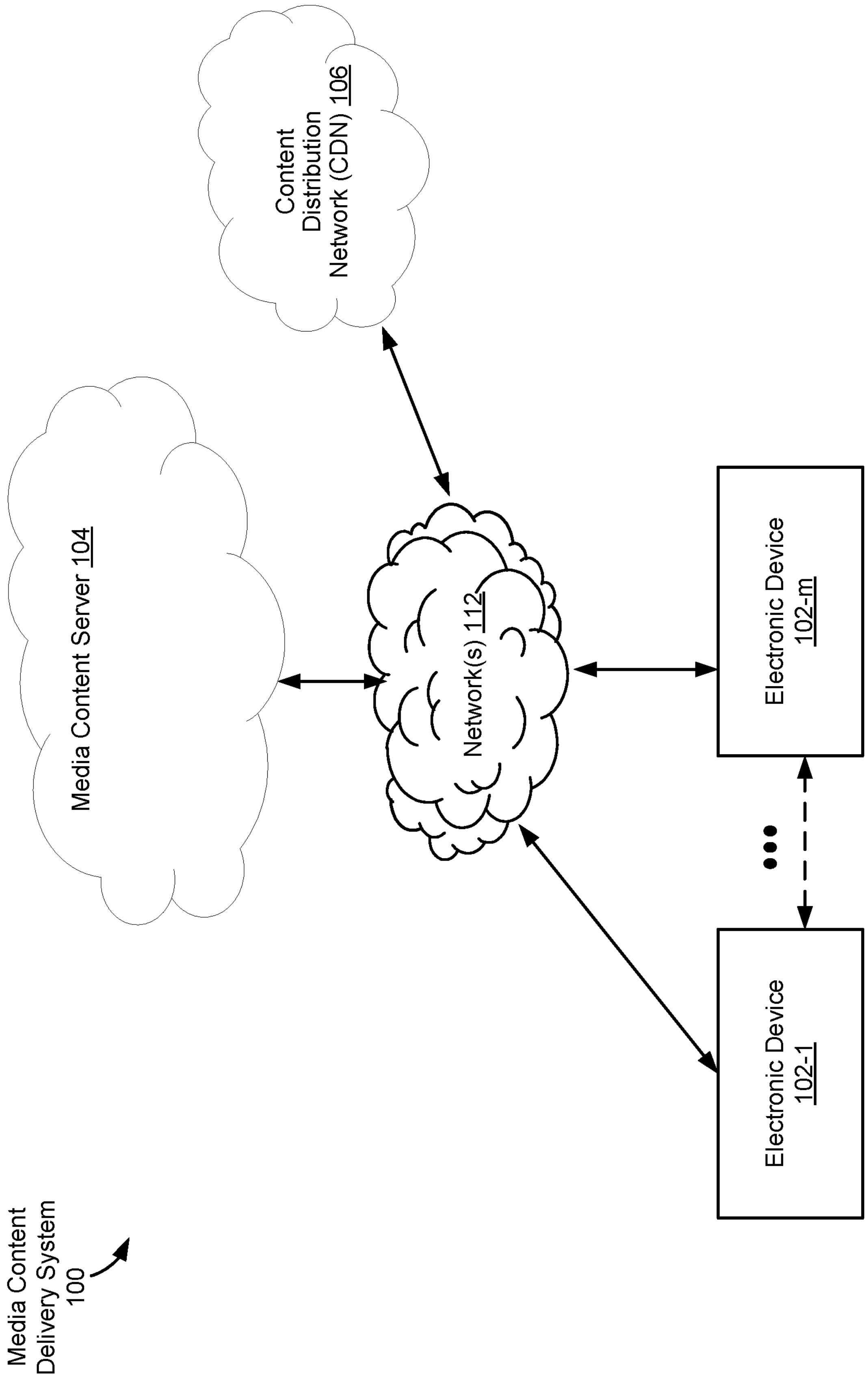
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device **102-*m*, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112** can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and **102-*m* are the same type of device (e.g., electronic device 102-1 and electronic device 102-*m* are both speakers). Alternatively, electronic device 102-1 and electronic device 102-*m*** include two or more different types of devices.

In some embodiments, electronic devices 102-1 and **102-*m* send and receive media-control information through network(s) 112. For example, electronic devices 102-1 and 102-*m* send media control requests (e.g., requests to play music, podcasts, movies, videos, or other media items, or playlists thereof) to media content server 104 through network(s) 112. Additionally, electronic devices 102-1 and 102-*m*, in some embodiments, also send indications of media items to media content server 104 through network(s) 112. In some embodiments, the media items are uploaded to electronic devices 102-1 and 102-*m* before the electronic devices forward the media items to media content server 104**.

In some embodiments, electronic device 102-1 communicates directly with electronic device **102-*m* (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-*m*. In some embodiments, electronic device 102-1 communicates with electronic device 102-*m* through network(s) 112. In some embodiments, electronic device 102-1 uses the direct connection with electronic device 102-*m* to stream content (e.g., data for media items) for playback on the electronic device 102-*m***.

In some embodiments, electronic device 102-1 and/or electronic device **102-*m* include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102**.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
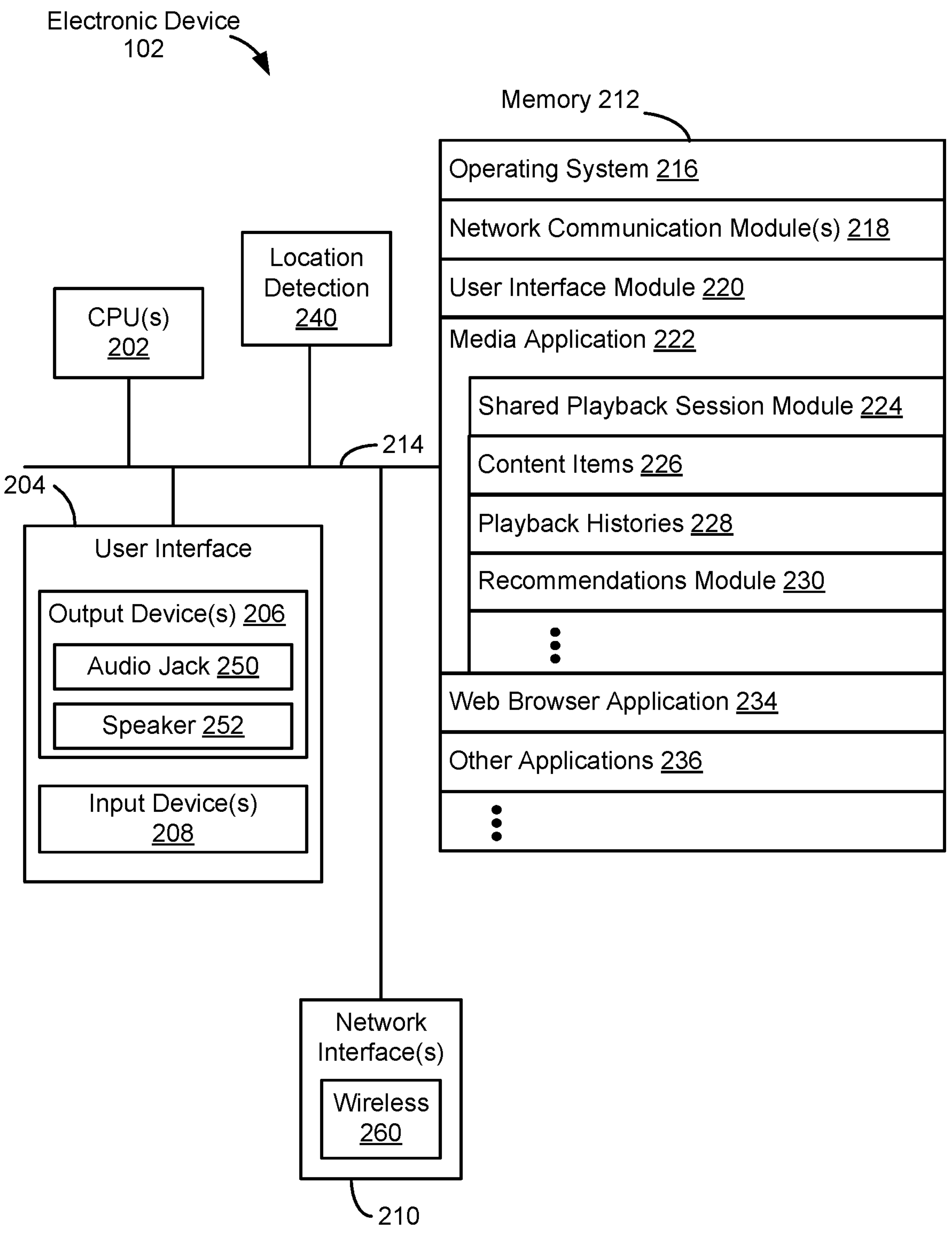
FIG. 2 is a block diagram illustrating an electronic device, in accordance with some embodiments.

FIG. 2 is a block diagram illustrating an electronic device 102 (e.g., electronic device 102-1 and/or electronic device **102-*m*, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214** optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the electronic device 102 to other computing devices (e.g., media presentation system(s), media content server 104, and/or other client devices) via the one or more network interface(s) 210 (wired or wireless) connected to one or more network(s) 112;

- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes the following modules (or sets of instructions), or a subset or superset thereof:
  - a shared playback session module 224 for enabling an electronic device 102 to initiate and/or join a shared playback session with one or more other users with electronic devices, and for storing and/or modifying a playback queue of the shared playback session;
  - content items 226 including one or more requested media content item(s), such as audio and video items, that are streamed to and/or locally stored at electronic device 102 for consumption;
  - playback histories 228 that stores previously consumed media content items of the user of electronic device 102 and/or of one or more other users (e.g., that are participating in a shared playback session with the user of electronic device 102). In some embodiments, playback histories are represented by probabilistic data structures;
  - recommendations module 230 for generating one or more recommendations for the user of electronic device 102 that are selectable by the user to be added to the shared playback session. In some embodiments, the recommendations are generated based on the playback histories 228 and/or based on the media content items in the queue of (e.g., and/or previously played back in) the shared playback session;
- a web browser application 234 for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
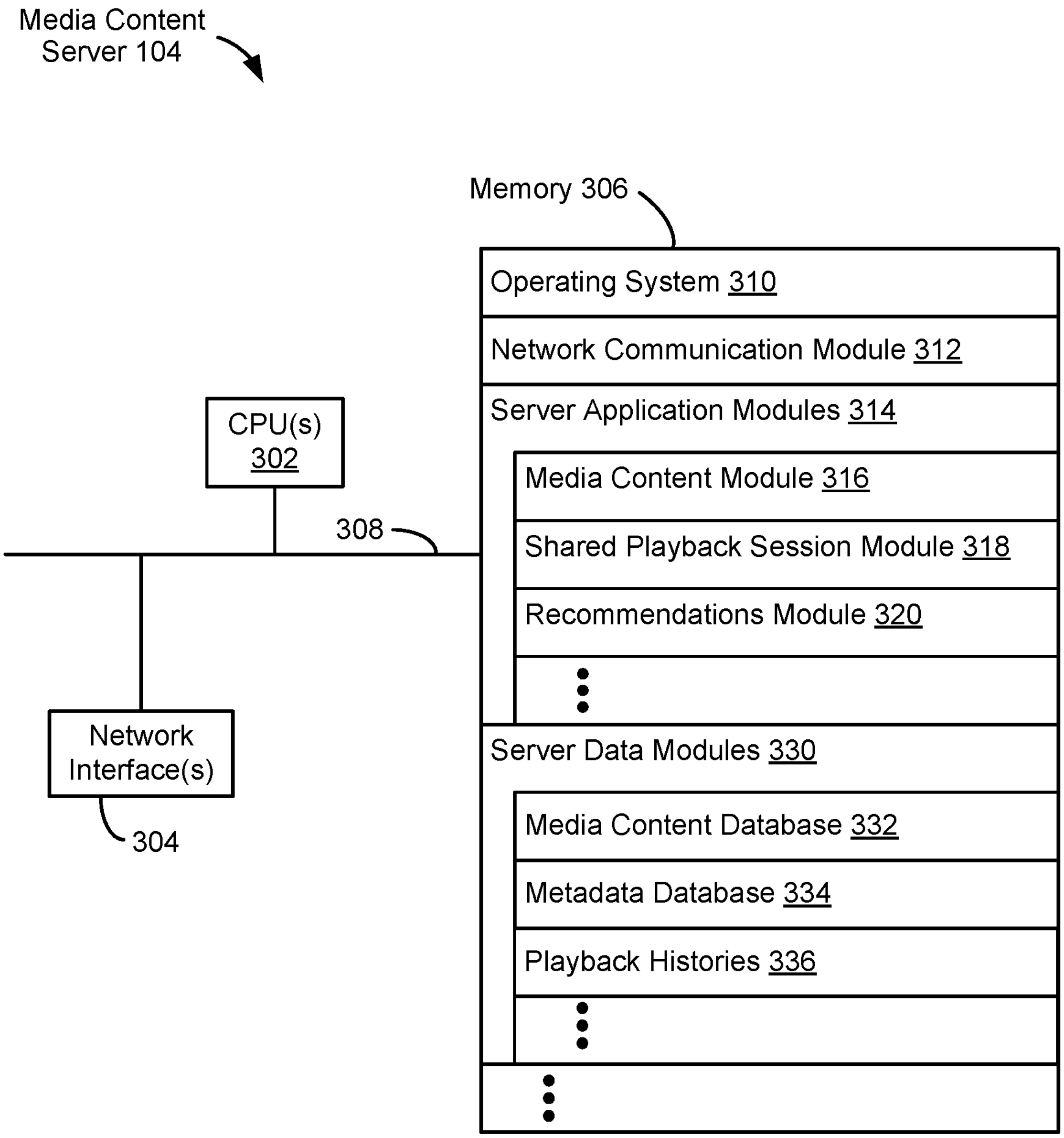
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content module 316 for storing one or more media content items and/or sending (e.g., streaming), to the electronic device, one or more requested media content item(s);
  - a shared playback session module 318 for enabling electronic devices (e.g., electronic device 102) to initiate and/or join a shared playback session with one or more other electronic devices, and for storing and/or modifying a playback queue of the shared playback session;
  - recommendations module 230 for receiving a request from a respective electronic device 102 and generating one or more recommendations to present at electronic device 102 that are selectable by a user to be added to the shared playback session. In some embodiments, the recommendations are generated based on the playback histories 336 and/or based on the media content items in the queue of (e.g., and/or previously played back in) the shared playback session;
- one or more server data module(s) 330 for handling the storage of and/or access to media items and/or metadata relating to the media items; in some embodiments, the one or more server data module(s) 330 include:
  - a media content database 332 for storing media items;
  - a metadata database 334 for storing metadata relating to the media items, including a genre associated with the respective media items; and
  - playback histories 336 that stores previously consumed media content items of user of electronic device 102 and/or of one or more other users (e.g., that are participating in a shared playback session). In some embodiments, playback histories are represented by probabilistic data structures.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4B:
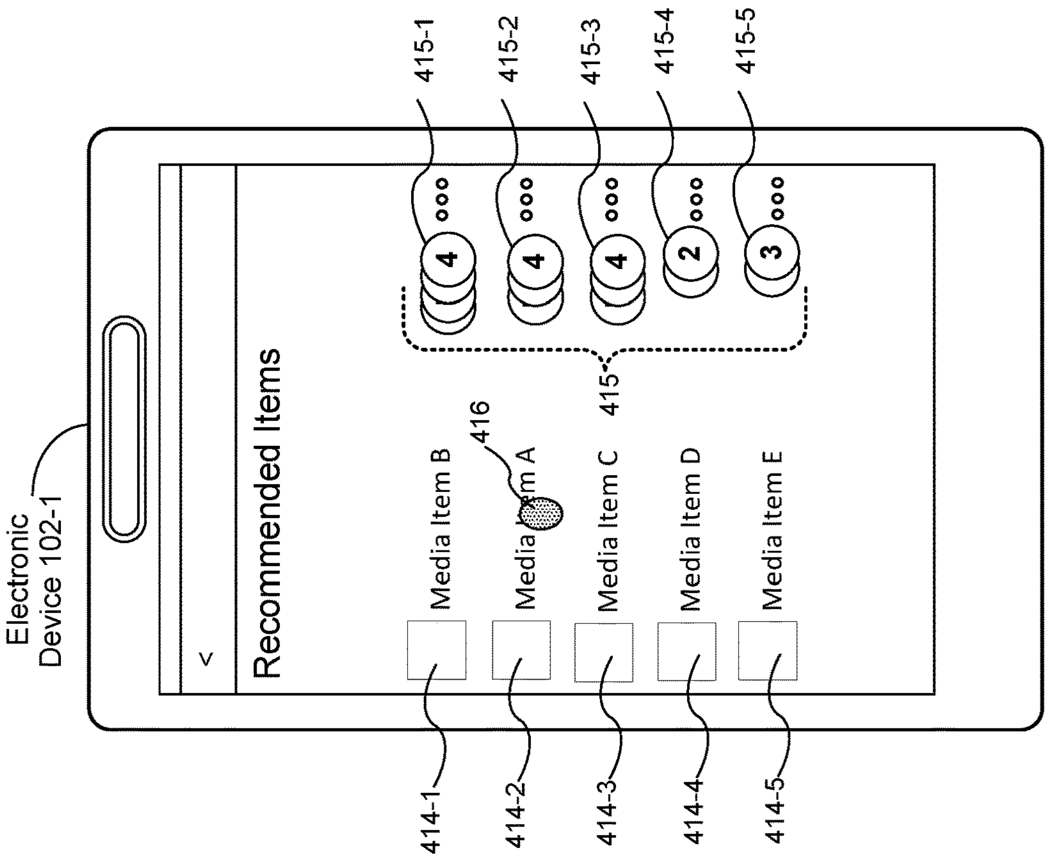
FIGS. 4A-4C are block diagrams illustrating example user interfaces for a shared playback session, in accordance with some embodiments.
Figure 4A:
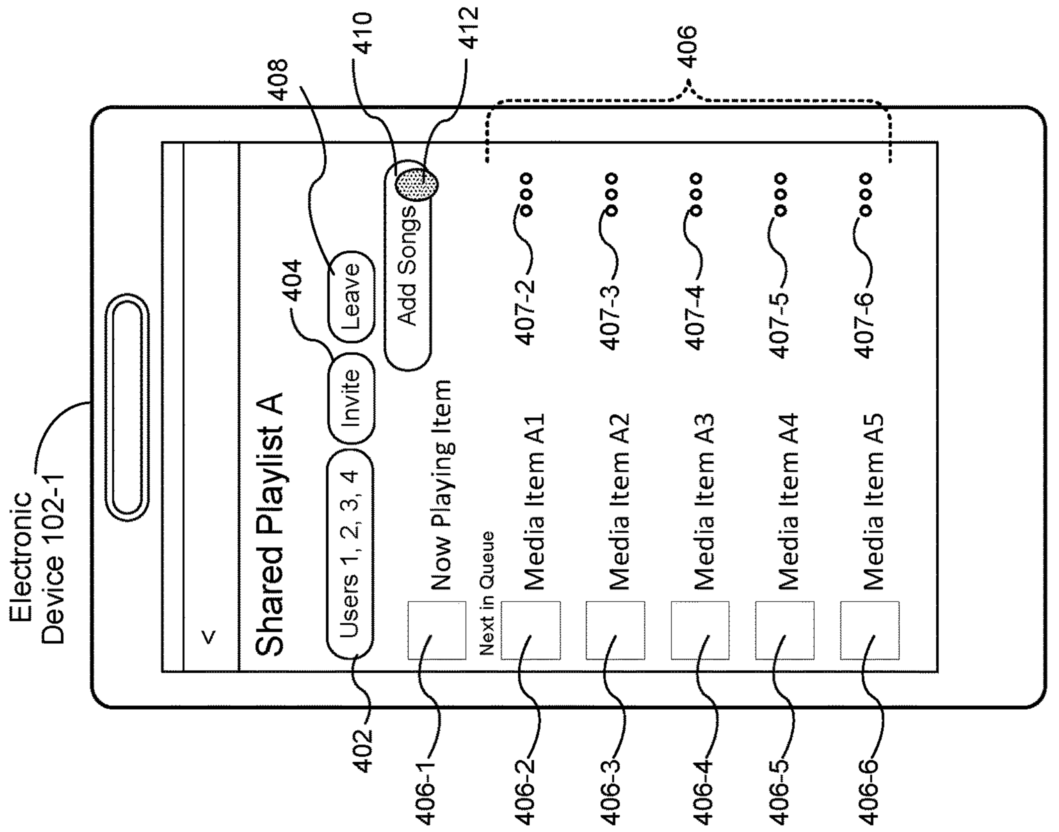
Figure 4C:
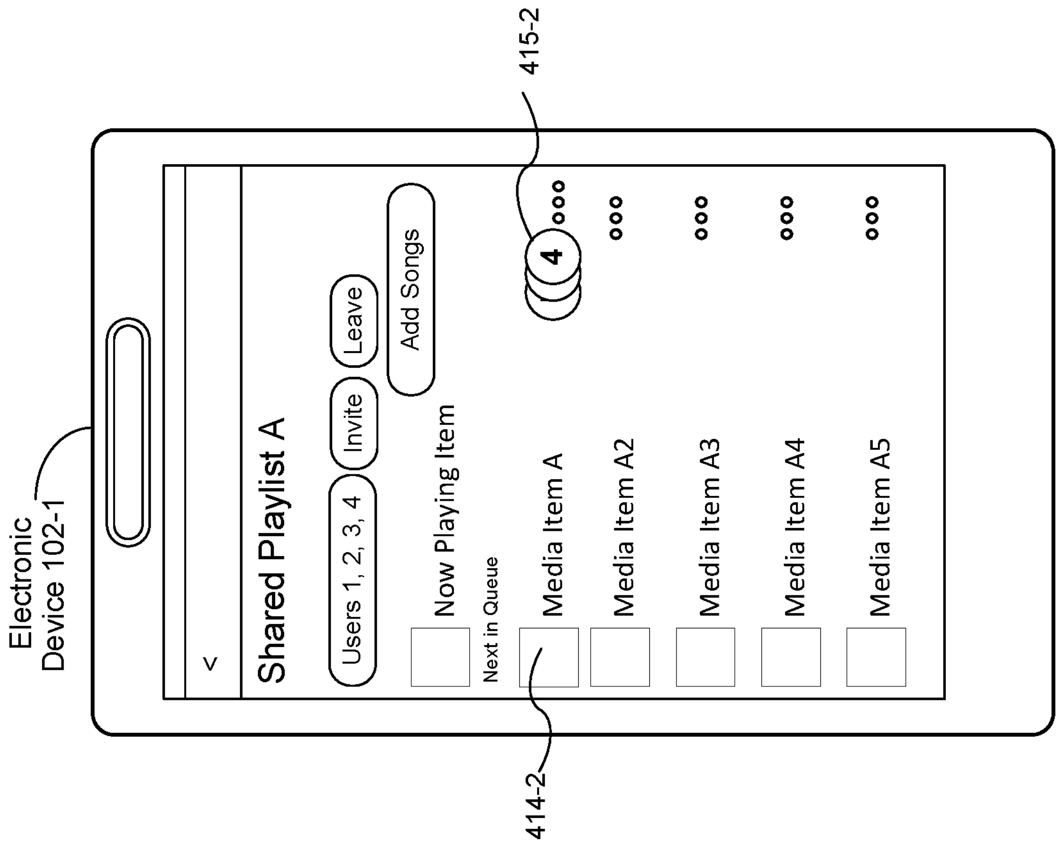

FIGS. 4A-4C illustrate example user interfaces for a shared playback session, in accordance with some embodiments. In some embodiments, the shared playback session includes a shared playback queue that includes a plurality of media items A1-A5 (e.g., corresponding to representations 406 of the plurality of media items A1-A5, including representation 406-2 of media item A1, representation 406-3 of media item A2, representation 406-3 of media item A3, representation 406-5 of media item A4, and representation 406-6 of media item A5). In some embodiments, the shared playback session includes a now playing media item, corresponding to representation 406-1, that is currently being streamed or otherwise provided to one or more presentation devices of the shared playback session. For example, users (e.g., that are not co-located) are enabled to playback the shared playback session at their individual devices and/or the electronic devices of users (e.g., that are co-located) do not playback, at each of the electronic devices, the media items for the shared playback session (e.g., multiple users have access to the user interfaces described herein on their individual devices, while the media content is streamed to a shared presentation device and/or multiple presentation devices at substantially the same time).

In some embodiments, the shared playback session enables a plurality of users (e.g., that are optionally co-located with each other) to participate in the shared playback session such that each user has access to view and/or modify the shared playback session. For example, user interface element 402 indicates the plurality of users that are participating in the shared playback session, including users 1, 2, 3 and 4. For example, each of users 1, 2, 3 and 4 are associated with an electronic device (e.g., at which the user is logged into a media application on the electronic device). For example, after a respective user has joined the shared playback session, the respective user is enabled to view the user interface illustrated in FIG. 4A at their respective electronic device.

In some embodiments, users are prompted, automatically without user input, to join a nearby shared playback session in accordance with the respective user's device coming within a predefined area of another electronic device that is participating in the shared playback session and/or a presentation device playing back media from the shared playback session. In some embodiments, invite option 404 is displayed at electronic device 102-1 to enable the first user to invite other users (e.g., from a contacts list or that are detected nearby) to join the shared playback session. In some embodiments, the users leave the shared playback session in response to selection of leave button 408 (e.g., and/or by leaving the predefined area of the shared playback session). In some embodiments, the user interface element 402 is dynamically updated to reflect a current status of the shared playback session (e.g., to reflect which users have joined and/or left the shared playback session).

In some embodiments, each user of the plurality of users is enabled to add (e.g., using a respective electronic device associated with the respective user) one or more media items to the shared playback queue. For example, the user interface illustrated at electronic device 102-1 in FIG. 4A for a first user that is participating in the shared playback session, "Shared Playlist A," includes an add songs button 410. In response to a user input 412 selecting the add songs button 410, the electronic device 102-1 displays, as illustrated in FIG. 4B, representations 414 of recommended media items from which the first user is able to select one or more media items to be added to Shared Playlist A.

In some embodiments, the recommended media items are selected using the method described with reference to FIG. 5A. For example, for the first user (e.g., user 1), the recommended media items corresponding to representations 414 are selected from a subset of the first user's listening history that also appear in one or more other playback histories of the other users of the shared playback session (e.g., users 2, 3 and 4), as indicated by probabilistic data structures for the playback histories of those other users.

As illustrated in FIG. 4B, in some embodiments, each recommended media item includes an indication 415 (e.g., media item B is shown with indication 415-1, media item A is shown with indication 415-2, media item C is shown with indication 415-3, media item D is shown with indication 415-4 and media item E is shown with indication 415-5) identifying one or more other users in the shared playback session that have previously consumed the respective media item (e.g., the media item appears, or is probabilistically likely to appear, in the playback history of the other user(s)). In some embodiments, the indication 415 includes a plurality of avatars, user photos, user initials, symbols, and/or other user identifiers. For example, the indication 415 includes a plurality of stacked circles that include profile photos for the users that have consumed the respective recommended media item. As such, when selecting which media item to select from the set of recommended media items, device 102 displays, for user 1, how many, and which, other users have previously consumed the media items so that user 1 is better informed to select a media item that other users are more likely to enjoy within the shared playback session.

FIG. 4B illustrates a user input 416 selecting media item A (e.g., corresponding to representation 414-2), which, based on retrieval of probabilistic data structures for users 2, 3 and 4, appears in (e.g. or is likely to appear in) the playback history of users 1, 3 and 4 (e.g., as described with reference to FIG. 5A). In some embodiments, in response to the user input 416, media item A is added to the shared playback session, as illustrated in FIG. 4C. In some embodiments, media item A is added as a next media item to playback after the "Now Playing Item" completes playback. It will be understood that other arrangements of the newly added media item A may be provided. For example, media item A is added to the end of the playback queue for the shared playback session and/or is randomly inserted. In some embodiments, users are enabled to reorder the media items in the playback queue for the shared playback session, as well as optionally perform one or more other controls, such as volume, skipping tracks, rewinding tracks, and/or modify other playback options.

As illustrated in FIG. 4C, in some embodiments, the representation 414-2 of media item A includes the indication 415-2 that displays which users have previously consumed media item A (e.g., as determined by the probabilistic data structure described with reference to FIG. 5A). In some embodiments, media items in the queue of the shared playback session that were automatically added, or otherwise selected (e.g., preselected), without a user selecting the media items from a recommended set, are not displayed with an indication 415.

Figure 5A:
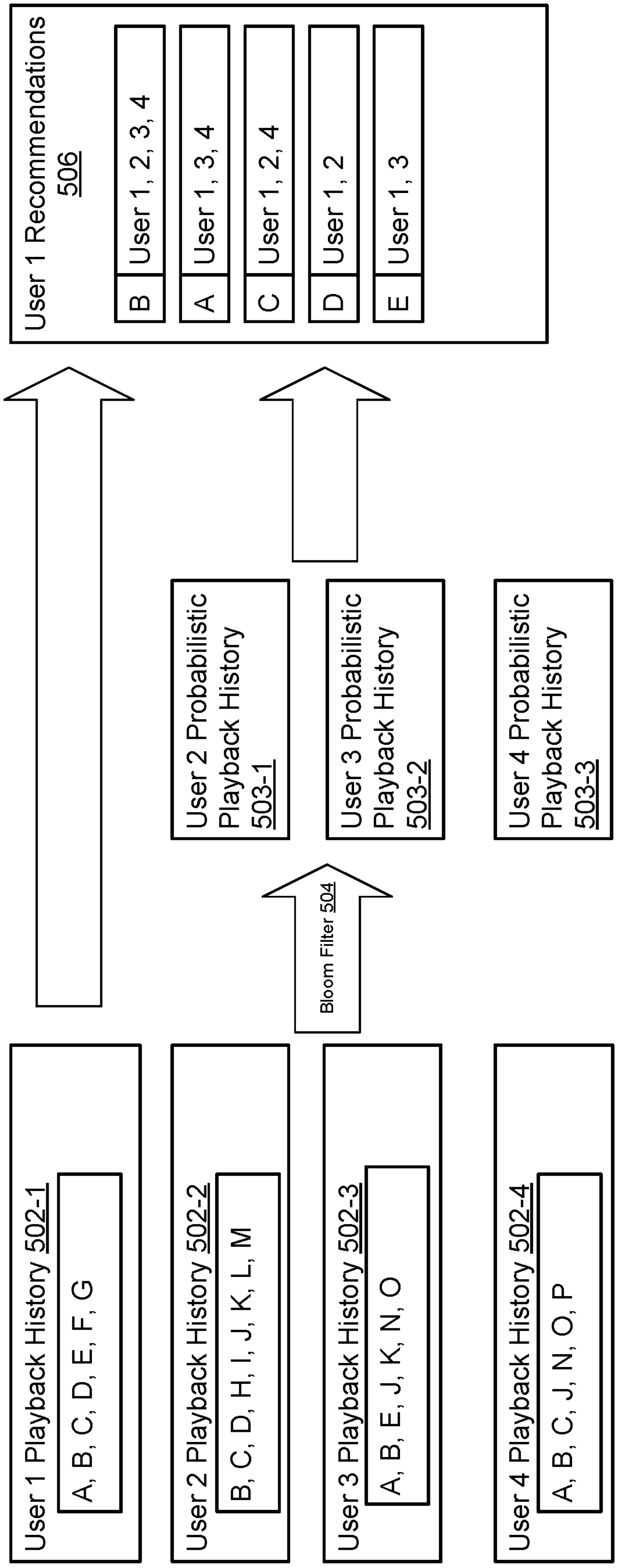
FIG. 5A is a block diagram illustrating use of probabilistic data structures for a plurality of playback histories to generate a list of recommended media items, in accordance with some embodiments.

FIG. 5A illustrates a block diagram for using a probabilistic data structure 503 (e.g., including probabilistic playback histories 503-1, 503-2 and 503-3) for each of a plurality of users to generate a set of recommended media items (e.g., including the media items represented in FIG. 4B) for a first user (e.g., user 1). In the example shown in FIG. 5A, probabilistic data structure 503-1 corresponds to user 2, probabilistic data structure 503-2 corresponds to user 3, and probabilistic data structure 503-3 corresponds to user 4. In some embodiments, the set of recommended media items are generated (e.g., at a server system and/or at electronic device 102-1) in real-time, in response to detecting the user input 412 corresponding to a request to add songs to Shared Playlist A. Because the users in the shared playback session are updated dynamically (e.g., as users join and/or leave the session), the set of recommended media items is fetched by determining, using a probabilistic data structure, the playback histories of the current users in the playback session at the time of the request corresponding to user input 412. Using a probabilistic data structure to determine that a media item likely does or does not appear in the playback histories of the current users enables the system to return results faster than individually checking the entirety of the playback histories for all of the users in the shared playback session. In some embodiments, a probabilistic data structure is not used for user 1, since user 1 is the user that is retrieving the set of recommended media items (e.g., a full, or deterministic, listening history is used for the user retrieving the set of recommended media items, whereas a probabilistic data structure is used for the other users in the listening session, so as to balance computational expense with reliability of recommendations for user 1).

In some embodiments, in response to user 1 requesting to add songs to the shared playback session (e.g., Shared Playlist A), the system accesses the playback history 502-1 of user 1, which represents media items that user 1 has previously consumed, including media items A, B, C, D, E, F, G. In some embodiments, the playback history of a respective user is stored (e.g., at a server system associated with the media providing service that provides the shared playback session) and includes recency information (e.g., how long ago a respective media item in the listening history was consumed by the user) about media items, a number of times a media item was consumed by the respective user, and/or other information about the media item (e.g., a category, label, vector representation and/or tags associated with the media item). For example, media items are represented by vector representations in a vector space such that more similar media items (e.g., based on genre, danceability, tempo, tags, mood, and/or other factors) are closer together (e.g., measured by Euclidean distance) in the vector space than dissimilar media items. As such, when generating recommendations, the system takes into account a similarity, or relatedness, between media items already in the shared playback queue and the candidate media items to recommend to a respective user.

Figure 5B:
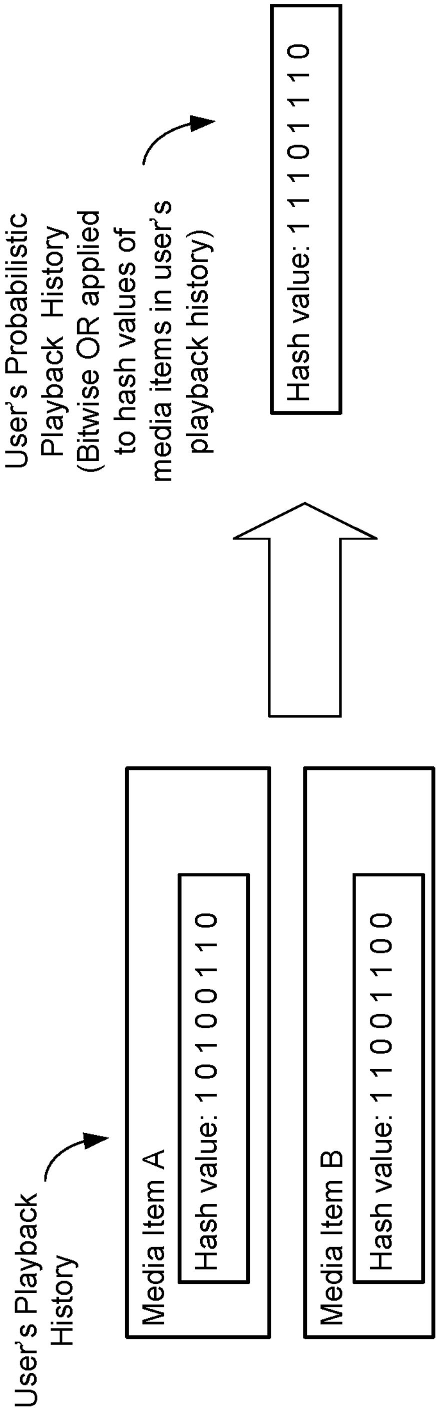
FIG. 5B illustrates an example of computation of a probabilistic data structure for a playback history, in accordance with some embodiments.

In some embodiments, in response to the request from the electronic device of user 1 to add songs to the shared playback session, the system further accesses the playback histories of the other users that are participating in the shared playback session at the time of the request. For example, the system retrieves user 2's playback history 502-2, user 3's playback history 502-3 and user 4's playback history 502-4. In some embodiments, instead of retrieving the entirety of the playback histories of the other users (e.g., users 2, 3 and 4), the system retrieves a probabilistic data structure 503 that represents a respective playback history of each user to minimize the amount of data that is retrieved for generating the recommendations in near-real-time. These probabilistic data structures may be precomputed (e.g., on a daily, weekly, or monthly basis), e.g., in advance of the request to add songs to the shared playback session. As such, user 2's playback history 502-2, user 3's playback history 502-3 and user 4's playback history 502-4 are represented by Bloom Filters 504 (e.g., or another probabilistic data structure), as shown in FIG. 5B.

In some embodiments, the system determines media items that appear in user 1's playback history 502-1 that also appear in one or more of the other users' playback histories that are represented by probabilistic data structures 503. For example, the system checks whether media items A, B, C, D, E, F, and G appear in one or more of the probabilistic data structures representing user 2's playback history 502-2, user 3's playback history 502-3 and/or user 4's playback history 502-4 to generate user 1's recommendations 506.

For example, media item B also appears in the probabilistic data structure 503 representing the playback histories of users 2, 3 and 4; media item A also appears in the probabilistic data structure representing the playback histories of users 3 and 4; media item C also appears in the probabilistic data structure representing the playback histories of users 2 and 4; media item D also appears in the probabilistic data structure representing the playback histories of user 2; and media item E also appears in the probabilistic data structure representing the playback histories of user 3.

In some embodiments, the recommendations 506 are presented in a user interface (e.g., as illustrated in FIG. 4B) that includes an indication (e.g., indications 415) of which other users have consumed the respective recommended media item. In some embodiments, the recommendations 506 are presented in an order that is based on the number of other users that have previously consumed the respective media items. For example, the media items that are consumed by the most other users participating in the shared playback session are presented at the top of the list (e.g., media item B), while media items that have only been consumed by one other user (e.g., media items D and E) are presented at the bottom of the list.

In some embodiments, the recommendations 506 are further based on the media items that are already in the queue for the shared listening session. For example, in retrieving user 1's playback history 502-1, media items that are related to (e.g., similar to, based on vector representations of) the media items 406 that are included in Shared Playlist A are selected (e.g., media items A, B, C, D, E, F, G are selected from a larger playback history data set as being related to the media items 406).

In some embodiments, the media items included in recommendations 506 are ordered based on how related each media item is to the media items 406 that are already included in the queue of the shared playback session. For example, the system determines, for each media item, a metric (e.g., a distance between respective vector representations of respective media items) that represents how closely the media item relates to one or more other media items already included in the shared playback queue.

As illustrated in FIG. 5A, in some embodiments, user 1's recommendations 506 are limited to media items that appear in user 1's listening history. For example, although media item O appears in the playback histories (represented by a probabilistic data structure) of user 3 and user 4 and media item J appears in the playback histories of users 2, 3 and 4, because media items O and J do not appear in user 1's playback history, they are not included in the recommendations 506.

FIG. 5B illustrates an example of computation of a probabilistic data structure for a playback history (e.g., using a Bloom filter), in accordance with some embodiments. As noted above, these probabilistic data structures may be pre-computed (e.g., with respect to a request to add media items to a listening session) on a periodic basis (e.g., daily, weekly, monthly, or whenever a user listens to a new media item).

In this example, each media item in the user's playback history is applied to a hash function (e.g., a unique identifier for the media item is applied to the hash function). The hash function returns a series of bits, e.g., either a 1 or a 0. In this example, the user listened to media item A, which hashed to 1 0 1 0 0 1 1 0, and media item B, which hashed to 1 1 0 0 1 1 0 0. The hash values for the media items in the user's listening history are combined (e.g., using a logical bitwise OR), such that, in this example, the probabilistic data structure for the user is 1 1 1 0 1 1 1 0.

In some embodiments, to assess whether a media item is in the user's playback history using the probabilistic data structure, the system checks whether the bits corresponding to a "1" in that media item's hash value are present as "is" in the user's probabilistic data structure. For example, media item A has "is" at the $0^{th}$, $2^{nd}$, $5^{th}$, and $6^{th}$ bits, and the user's probabilistic data structure also has "is" at the same bits, leading to a determination that media item A is in the user's playback history. In some circumstances, this process is much faster than checking the entirety of a user's playback history to see if media item A is present (e.g., using a database lookup).

Note that these data structures are probabilistic in that there is a risk of a false positive. As more media items are added to the probabilistic data structure, more bits are flipped from 0 to 1, thus increasing the chance that a hash value for a media item not within the user's playback history will have "is" in the same positions as the user's probabilistic data structure. This risk can be mitigated by increasing the size of the hash function. In this example, an 8-bit hash function is used, but one of skill in the art will recognize that a hash function of any length may be used (and, generally speaking, will be much longer than 8-bits). In some embodiments, a hash length is selected so as to maintain the false positive rate below an acceptable threshold while otherwise minimizing the hash length so as to minimize computational expense.

Figure 6A:
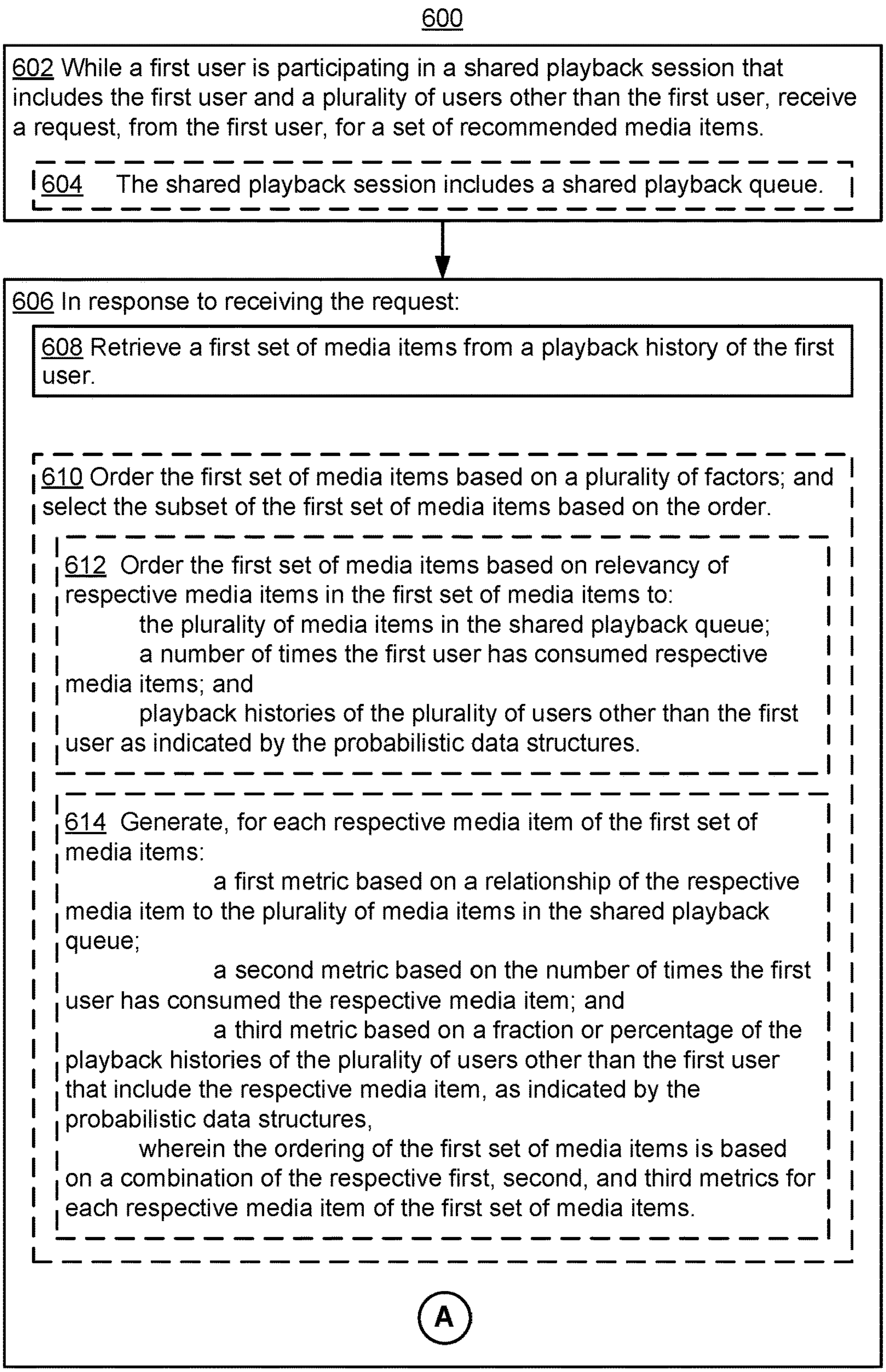
FIGS. 6A-6B are flow diagrams illustrating a method for providing a set of recommended media items, in accordance with some embodiments.
Figure 6B:
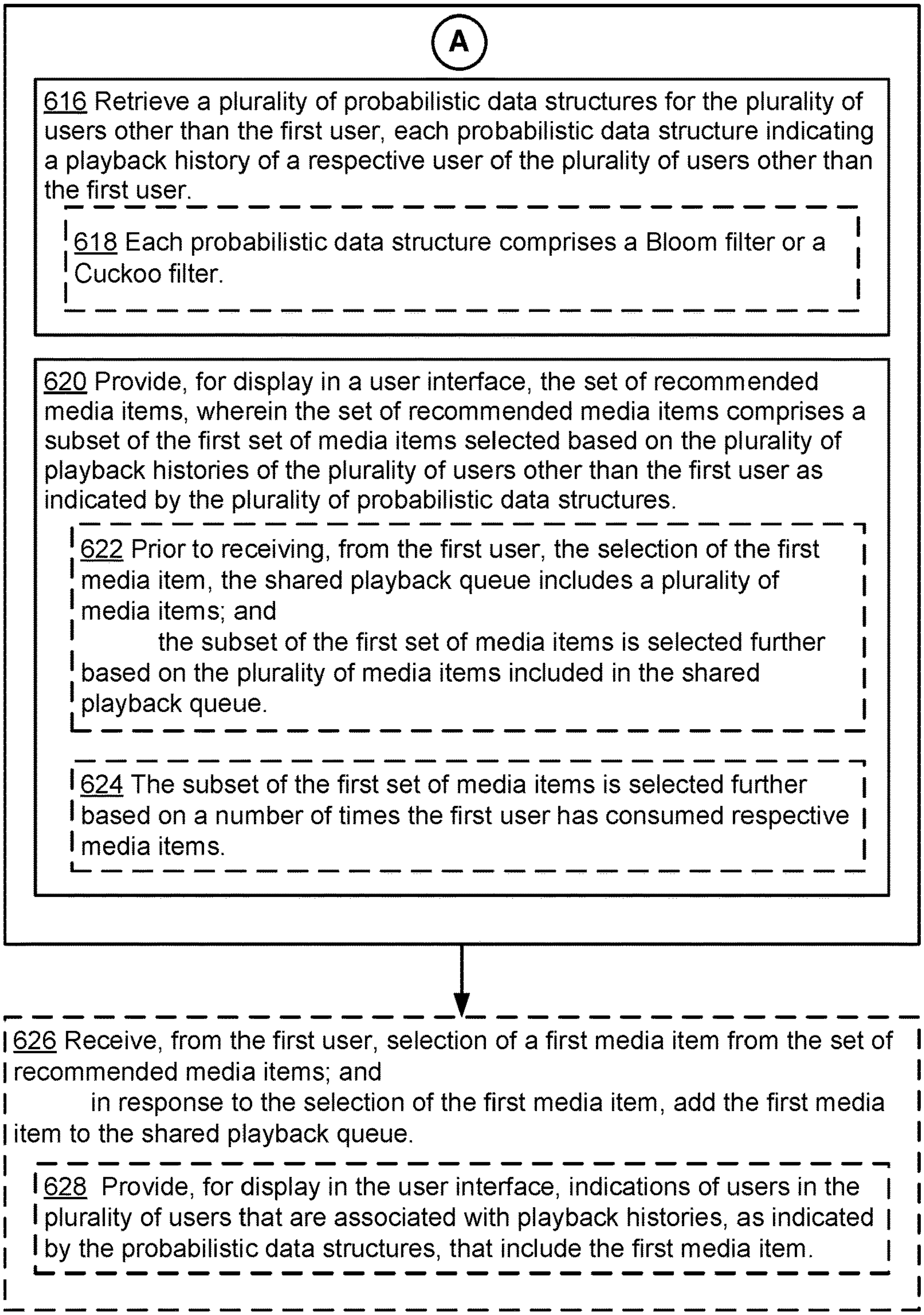

FIGS. 6A-6B are flow diagrams illustrating a method 600 of generating a request message with a hierarchical structure, in accordance with some embodiments. Method 600 may be performed at a computer system (e.g., media content server 104 and/or electronic device(s) 102) having one or more processors and memory storing instructions for execution by the one or more processors. In some embodiments, the method 600 is performed by executing instructions stored in the memory (e.g., memory 212, FIG. 2, memory 306, FIG. 3) of the computer system. In some embodiments, the method 600 is performed by a combination of the server system (e.g., including media content server 104 and/or media content identifier server 504) and a client device (e.g., electronic device 102-1).

Referring now to FIG. 6A, in performing the method 600, while a first user is participating in a shared playback session that includes the first user and a plurality of users other than the first user, the computer system receives (602) a request, from the first user, for a set of recommended media items. For example, as described with reference to FIG. 4A, while the user of electronic device 102-1 is participating in Shared Playlist A, the user selects, via user input 412, Add Songs button 410 corresponding to a request for a set of recommended media items.

In some embodiments, the shared playback session includes (604) a shared playback queue (e.g., that is presented via one or more presentation devices for the plurality of users to consume) (e.g., wherein media items in the shared playback queue are played back, in the order indicated by the queue, substantially concurrently to the users in the shared playback session). For example, in FIG. 4A, the media items are to be played back, in order, as media item A1, media item A2, media item A3, media item A4, and media item A5. The Shared Playlist A is played back by one or more presentation devices at substantially the same time.

The computer system in response to receiving the request (606): retrieves (608) a first set of media items from a playback history of the first user; (e.g., top tracks over a period of time). For example, as described with reference to FIG. 5A, the system generates recommendations 506 for user 1 (e.g., and displays the recommendations in the user interface illustrated in FIG. 4B).

In some embodiments, the computer system orders (610) the first set of media items based on a plurality of factors; and selects the subset of the first set of media items based on the order. For example, as described with reference to FIG. 5A, the recommendations 506 are ordered based at least in part on a number of other users that have consumed the respective media items included in recommendations 506 and/or based on a similarity of the respective media item to the media items already included in the queue of Shared Playlist A.

In some embodiments, the ordering is (612) based on relevancy of respective media items in the first set of media items to: the plurality of media items in the shared playback queue; a number of times the first user has consumed respective media items; and the playback histories of the plurality of users other than the first user as indicated by the probabilistic data structures, as described with reference to FIGS. 5A-5B.

In some embodiments, the computer system generates (614), for each respective media item of the first set of media items: a first metric based on a relationship of the respective media item to the plurality of media items in the shared playback queue; a second metric based on the number of times the first user has consumed the respective media item; and a third metric based on a fraction or percentage of the playback histories of the plurality of users other than the first user that include the respective media item, as indicated by the probabilistic data structures, wherein the ordering of the first set of media items is based on a combination of the respective first, second, and third metrics for each respective media item of the first set of media items. For example, as described with reference to FIG. 5A, the media items in recommendations 506 are ordered based on the metric.

In some embodiments, the computer system retrieves (616) a plurality of probabilistic data structures for the plurality of users other than the first user, each probabilistic data structure (e.g., a Bloom or Cuckoo filter) indicating a playback history of a respective user of the plurality of users other than the first user (e.g., the data structure is probabilistic in that there is a risk of false positive). For example, in FIG. 5A, the playback histories 502-2, 502-3 and 502-4 are represented by probabilistic data structures (e.g., bloom filters 504).

In some embodiments, each probabilistic data structure comprises (618) a Bloom filter or a Cuckoo filter.

The computer system provides (620), for display in a user interface, the set of recommended media items, wherein the set of recommended media items comprises a subset of the first set of media items selected based on the playback histories of the plurality of users other than the first user as indicated by the plurality of probabilistic data structures. For example, the recommendations 506 are displayed in the user interface illustrated in FIG. 4B as media items 414.

In some embodiments, prior to receiving, from the first user, the selection of the first media item, the shared playback queue includes (622) a plurality of media items. In some embodiments, the subset of the first set of media items is selected further based on the plurality of media items included in the shared playback queue (e.g., based on a vector distance between vectors representing respective media items in the first set of media items and a vector representing an average of the plurality of media items that are already included in the shared playback queue). For example, media items A1-A5 are already included in the queue of Shared Playlist A, and the recommendations 506 are selected based in part on characteristics of the media items A1-A5.

In some embodiments, the subset of the first set of media items is selected (624) further based on a number of times the first user has consumed respective media items (e.g., in a particular time period). For example, from the playback history 502-1 of user 1, media items that have been recently consumed the most number of times are prioritized in the recommendations 506.

In some embodiments, the computer system receives (626), from the first user, selection of a first media item from the set of recommended media items; and in response to the selection of the first media item, adding the first media item to the shared playback queue. For example, as described with reference to FIG. 4B, in response to user input 416 selecting media item A, media item A is added to the shared playback queue, as illustrated in FIG. 4C.

In some embodiments, the computer system provides (628), for display in the user interface, indications of users in the plurality of users that are associated with playback histories, as indicated by the probabilistic data structures, that include the first media item. For example, as illustrated in FIG. 4C, indication 415-2 represents which other users have consumed media item A, which was added to the shared playback queue by user 1.

Although FIGS. 6A-6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:

while a first user is participating in a shared playback session that includes a shared playback queue for the first user and a plurality of users other than the first user, receiving a request, from the first user, for a set of recommended media items;

in response to receiving the request:

retrieving a first set of media items from a playback history of the first user;

retrieving a plurality of probabilistic data structures for the plurality of users other than the first user, each probabilistic data structure indicating a playback history of a respective user of the plurality of users other than the first user;

providing, for display in a user interface, the set of recommended media items, wherein the set of recommended media items comprises a subset of the first set of media items selected based on the playback histories of the plurality of users other than the first user as indicated by the plurality of probabilistic data structures;

receiving, from the first user, selection of a first media item from the set of recommended media items; and in response to the selection of the first media item, adding the first media item to the shared playback queue; and providing, for display in the user interface, indications of which users of the plurality of users have associated playback histories that include the first media item, as indicated by the probabilistic data structures.

2. The method of claim 1, wherein:

prior to receiving, from the first user, the selection of the first media item, the shared playback queue includes a plurality of media items; and the subset of the first set of media items is selected further based on the plurality of media items included in the shared playback queue.

3. The method of claim 1, further comprising:

ordering the first set of media items based on a plurality of factors; and selecting the subset of the first set of media items based on the order.

4. The method of claim 3, wherein the ordering is based on relevancy of respective media items in the first set of media items to one or more of:

media items in the shared playback queue;

a number of times the first user has consumed respective media items; or the playback histories of the plurality of users other than the first user as indicated by the probabilistic data structures.

5. The method of claim 3, further comprising:

generating, for each respective media item of the first set of media items:

a first metric based on a relationship of the respective media item to media items in the shared playback queue;

a second metric based on the number of times the first user has consumed the respective media item; and a third metric based on a fraction or percentage of the playback histories of the plurality of users other than the first user that include the respective media item, as indicated by the probabilistic data structures, wherein the ordering of the first set of media items is based on a combination of any two or more of the respective first, second, or third metrics for each respective media item of the first set of media items.

6. The method of claim 1, wherein the subset of the first set of media items is selected further based on a number of times the first user has consumed respective media items.

7. The method of claim 1, wherein each probabilistic data structure comprises a Bloom filter or a Cuckoo filter.

8. A computer system comprising:

one or more processors; and memory storing one or more programs, the one or more programs including instructions for while a first user is participating in a shared playback session that includes a shared playback queue for the first user and a plurality of users other than the first user, receiving a request, from the first user, for a set of recommended media items;

in response to receiving the request:

retrieving a first set of media items from a playback history of the first user;

retrieving a plurality of probabilistic data structures for the plurality of users other than the first user, each probabilistic data structure indicating a playback history of a respective user of the plurality of users other than the first user;

providing, for display in a user interface, the set of recommended media items, wherein the set of recommended media items comprises a subset of the first set of media items selected based on the playback histories of the plurality of users other than the first user as indicated by the plurality of probabilistic data structures;

receiving, from the first user, selection of a first media item from the set of recommended media items; and in response to the selection of the first media item, adding the first media item to the shared playback queue; and providing, for display in the user interface, indications of which users of the plurality of users have associated playback histories that include the first media item, as indicated by the probabilistic data structures.

9. The computer system of claim 8, wherein:

prior to receiving, from the first user, the selection of the first media item, the shared playback queue includes a plurality of media items; and the subset of the first set of media items is selected further based on the plurality of media items included in the shared playback queue.

10. The computer system of claim 8, wherein the one or more programs further comprise instructions for:

ordering the first set of media items based on a plurality of factors; and selecting the subset of the first set of media items based on the order.

11. The computer system of claim 10, wherein the ordering is based on relevancy of respective media items in the first set of media items to one or more of:

media items in the shared playback queue;

a number of times the first user has consumed respective media items; or the playback histories of the plurality of users other than the first user as indicated by the probabilistic data structures.

12. The computer system of claim 10, wherein the one or more programs further comprise instructions for:

generating, for each respective media item of the first set of media items:

a first metric based on a relationship of the respective media item to media items in the shared playback queue;

a second metric based on the number of times the first user has consumed the respective media item; and a third metric based on a fraction or percentage of the playback histories of the plurality of users other than the first user that include the respective media item, as indicated by the probabilistic data structures, wherein the ordering of the first set of media items is based on a combination of any two or more of the respective first, second, or third metrics for each respective media item of the first set of media items.

13. The computer system of claim 8, wherein the subset of the first set of media items is selected further based on a number of times the first user has consumed respective media items.

14. A non-transitory computer-readable storage medium storing one or more programs for execution by a computer system with one or more processors, the one or more programs comprising instructions for:

while a first user is participating in a shared playback session that includes a shared playback queue for the first user and a plurality of users other than the first user, receiving a request, from the first user, for a set of recommended media items;

in response to receiving the request:

retrieving a first set of media items from a playback history of the first user;

retrieving a plurality of probabilistic data structures for the plurality of users other than the first user, each probabilistic data structure indicating a playback history of a respective user of the plurality of users other than the first user;

providing, for display in a user interface, the set of recommended media items, wherein the set of recommended media items comprises a subset of the first set of media items selected based on the playback histories of the plurality of users other than the first user as indicated by the plurality of probabilistic data structures;

receiving, from the first user, selection of a first media item from the set of recommended media items; and in response to the selection of the first media item, adding the first media item to the shared playback queue; and providing, for display in the user interface, indications of which users of the plurality of users have associated playback histories that include the first media item, as indicated by the probabilistic data structures.

15. The non-transitory computer-readable storage medium of claim 14, wherein:

prior to receiving, from the first user, the selection of the first media item, the shared playback queue includes a plurality of media items; and the subset of the first set of media items is selected further based on the plurality of media items included in the shared playback queue.

16. The non-transitory computer-readable storage medium of claim 14, wherein the one or more programs further comprise instructions for:

ordering the first set of media items based on a plurality of factors; and selecting the subset of the first set of media items based on the order.

17. The non-transitory computer-readable storage medium of claim 16, wherein the ordering is based on relevancy of respective media items in the first set of media items to one or more of:

media items in the shared playback queue;

a number of times the first user has consumed respective media items; or the playback histories of the plurality of users other than the first user as indicated by the probabilistic data structures.

18. The non-transitory computer-readable storage medium of claim 16, wherein the one or more programs further comprise instructions for:

generating, for each respective media item of the first set of media items:

a first metric based on a relationship of the respective media item to media items in the shared playback queue;

a second metric based on the number of times the first user has consumed the respective media item; and a third metric based on a fraction or percentage of the playback histories of the plurality of users other than the first user that include the respective media item, as indicated by the probabilistic data structures, wherein the ordering of the first set of media items is based on a combination of any two or more of the respective first, second, or third metrics for each respective media item of the first set of media items.

19. The non-transitory computer-readable storage medium of claim 14, wherein the subset of the first set of media items is selected further based on a number of times the first user has consumed respective media items.

20. The non-transitory computer-readable storage medium of claim 14, wherein each probabilistic data structure comprises a Bloom filter or a Cuckoo filter.

* * * * *